United States Patent
Santi

(10) Patent No.: US 9,562,804 B2
(45) Date of Patent: Feb. 7, 2017

(54) FORKLIFT SCALE, LOAD CELL THEREOF AND METHOD OF MEASURING A FORKLIFT LOAD

(71) Applicant: Larry D. Santi, Renton, WA (US)

(72) Inventor: Larry D. Santi, Renton, WA (US)

(*) Notice: Subject to any disclaimer, the term of this patent is extended or adjusted under 35 U.S.C. 154(b) by 100 days.

(21) Appl. No.: 14/213,727

(22) Filed: Mar. 14, 2014

(65) Prior Publication Data

US 2014/0262550 A1 Sep. 18, 2014

Related U.S. Application Data

(60) Provisional application No. 61/785,316, filed on Mar. 14, 2013.

(51) Int. Cl.

| | | |
|---|---|---|
| *G01G 19/12* | (2006.01) | |
| *B66F 17/00* | (2006.01) | |
| *B66F 9/12* | (2006.01) | |
| *G01G 19/08* | (2006.01) | |

(52) U.S. Cl.
CPC ............ *G01G 19/12* (2013.01); *B66F 9/12* (2013.01); *B66F 17/003* (2013.01); *G01G 19/083* (2013.01)

(58) Field of Classification Search
CPC ......... G01G 19/083; G01G 19/12; B66F 9/12; B66F 17/003
See application file for complete search history.

(56) References Cited

U.S. PATENT DOCUMENTS

| | | | |
|---|---|---|---|
| 2,850,181 A * | 9/1958 | Hamblin | B66F 17/003 177/139 |
| 2,935,213 A | 5/1960 | Cellitti et al. | |
| 3,724,575 A | 4/1973 | Kutsay | |
| 3,734,216 A * | 5/1973 | Nordstrom | G01G 3/1404 177/136 |
| 3,910,363 A * | 10/1975 | Airesman | G01G 19/083 177/139 |
| 3,927,560 A | 12/1975 | Farr | |
| 4,323,132 A * | 4/1982 | Bradley | G01G 19/083 177/128 |
| 4,326,424 A | 4/1982 | Koenig | |
| 4,421,186 A * | 12/1983 | Bradley | G01G 19/083 177/139 |
| 4,657,097 A | 4/1987 | Griffen | |
| 4,951,765 A | 8/1990 | Naito et al. | |
| 5,083,624 A | 1/1992 | Reichow | |

(Continued)

FOREIGN PATENT DOCUMENTS

| | | |
|---|---|---|
| JP | 07260554 A | 10/1995 |
| JP | 2007008614 A | 1/2007 |
| WO | 2011/019265 A2 | 2/2011 |

*Primary Examiner* — Natalie Huls
(74) *Attorney, Agent, or Firm* — Seed IP Law Group LLP

(57) ABSTRACT

A forklift scale to measure a load carried by a pair of forks of a forklift that includes a fork carriage to movably position the forks. The forklift scale includes a pair of load cells that are configured to mount to the fork carriage independent of each other and to removably receive a respective fork of the forklift. Each load cell includes a structural arrangement that couples the respective fork to the fork carriage during operation such that an entirety of the load carried by the forks during operation is transmitted to the carriage via the pair of load cells. Other related forklift scales, load cells thereof and methods of measuring a forklift load are also provided.

25 Claims, 8 Drawing Sheets

(56) References Cited

U.S. PATENT DOCUMENTS

| | | | |
|---|---|---|---|
| 5,837,946 A * | 11/1998 | Johnson | G01G 3/1404 177/136 |
| 6,002,090 A | 12/1999 | Johnson et al. | |
| 6,363,798 B1 | 4/2002 | Gitis et al. | |
| 6,422,800 B1 | 7/2002 | Reichow et al. | |
| 6,910,392 B2 | 6/2005 | Lockery et al. | |
| 8,353,388 B2 * | 1/2013 | Rice | B66F 9/07559 177/139 |
| 9,046,409 B2 * | 6/2015 | Siaw | B66F 9/20 |
| 9,073,738 B2 * | 7/2015 | Johnson | B66F 9/12 |
| 2005/0092530 A1 * | 5/2005 | Rice | G01G 23/3728 177/136 |
| 2005/0160837 A1 * | 7/2005 | Tellenbach | G01L 1/2287 73/862.625 |
| 2009/0260924 A1 * | 10/2009 | Rice | B66F 9/07559 187/238 |
| 2012/0175169 A1 * | 7/2012 | Siaw | B66F 9/20 177/136 |
| 2014/0262551 A1 * | 9/2014 | Santi | G01G 19/12 177/1 |
| 2014/0262552 A1 * | 9/2014 | Santi | G01G 3/14 177/1 |
| 2015/0093216 A1 * | 4/2015 | Pangrazio | B66F 17/003 414/21 |

* cited by examiner

FIG. 1 *(Prior Art)*

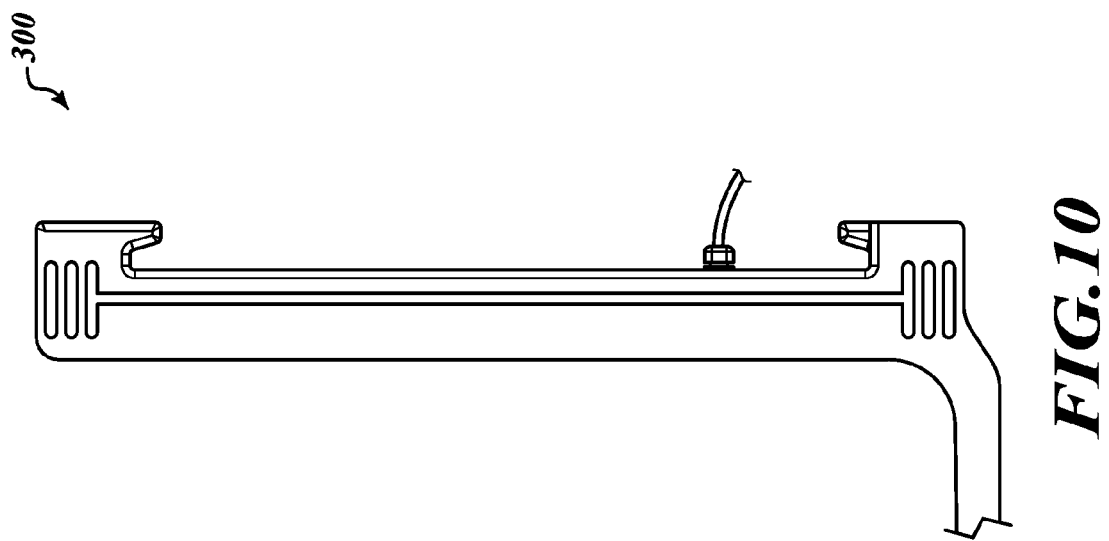

FORKLIFT SCALE, LOAD CELL THEREOF AND METHOD OF MEASURING A FORKLIFT LOAD

BACKGROUND

Technical Field

This disclosure generally relates to forklift scales, load cells thereof and methods of measuring a forklift load.

Description of the Related Art

Various systems and related methods are known for measuring a load carried by forklifts. These systems typically include a scale assembly that is positionable between the forks of a forklift and a fork carriage to sense a load placed on the forks. Examples of such systems can be found in U.S. Pat. Nos. 4,421,186; 6,002,090; and 8,353,388, all of which are incorporated herein by reference in their entirety.

Existing systems and methods for measuring a load carried by forklifts, however, may suffer from a variety of drawbacks or deficiencies. For example, some systems are quite bulky and overly complex. In addition, some systems are prone to inaccuracies in the measured load when the position of the load varies along the length of the forks. Some systems block or obstruct the view of the forklift operator and some systems may decrease the rated load capacity of the forklift because of the added weight of such systems and/or because the systems displace the forks too far from the fork carriage.

BRIEF SUMMARY

Embodiments described herein provide forklift scales and load cells that are well adapted to measure loads in a particularly accurate manner and in a compact and robust form factor. The forklift scales and load cells are independently mountable between the forks of a forklift and the fork carriage and can be installed with relatively minimal displacement of the forks from the fork carriage. Advantageously, this may allow the load rating of the host forklift to be maintained or substantially maintained despite the addition of the scales or load cells. Other advantages and benefits include the reduction or elimination of visual obstructions that are otherwise associated with conventional forklift scale systems. Still further, the forklift scales and load cells may be particularly easy to install and remove and can be scaled to provide a solution for a wide range of forklifts, including forklift trucks with load ratings from 5,000 lbs. up to and beyond 30 tons.

According to one embodiment, a forklift scale to measure a load carried by a pair of forks of a forklift that includes a fork carriage to movably position the forks may be summarized as including a pair of load cells configured to mount to the fork carriage independent of each other and to removably receive a respective fork of the forklift. Each load cell may have a structural arrangement that couples the respective fork to the fork carriage during operation such that an entirety of the load carried by the forks is transmitted to the carriage via the pair of independent load cells.

According to another embodiment, a forklift scale to measure a load carried by a pair of forks of a forklift having a fork carriage to movably position the forks may be summarized as including a first load cell having a deformable body configured to mount directly to the fork carriage and being configured to removably receive one of the pair of forks of the forklift; and a second load cell having a deformable body configured to mount directly to the fork carriage and being configured to removably receive the other one of the pair of forks of the forklift, wherein the first load cell and the second load cell are independently attachable to the fork carriage.

According to yet another embodiment, a load cell to measure a portion of a load carried by a pair of forks of a forklift that includes a fork carriage to movably position the forks may be summarized as including an elongated structural member including opposing portions separated by a primary aperture extending at least a majority of a height of the elongated structural member, the elongated structural member further including at least one pair of parallel offset horizontal strain gauge mounting surfaces at each of opposing ends thereof. The load cell may further include carriage engagement features configured to removably attach to complementary features of the fork carriage and fork engagement features configured to removably attach to complementary features of one of the forks. In this manner, the load cell may be readily coupled between the fork carriage and a respective fork of the forklift.

According to yet another embodiment, a load cell including various aspects and features of the embodiments described herein may be integrally formed with a base portion of a lifting fork to form an integral fork structure having load measuring capabilities.

According to still yet another embodiment, a method of measuring a load carried by a pair of forks of a forklift that includes a fork carriage to movably position the forks may be summarized as including obtaining strain gauge signals from a pair of independently mountable load cells that are each positioned between the fork carriage and a respective one of the forks; and processing the signals to obtain a load value indicative of a load shared by the pair of forks. The method may further include determining a position of the load carried by the pair of forks using the strain gauge signals from the pair of independently mountable load cells and adjusting the load value indicative of the load shared by the pair of forks based on said determined position. The method may also include disabling or limiting movement of the forklift based on said determined position. The method may further include determining a position of the load carried by the pair of forks using the strain gauge signals from a first bridge arrangement and a second bridge arrangement and adjusting the load value indicative of the load shared by the pair of forks based on said determined position. The method may also include disabling or limiting movement of the forklift based on said determined position.

BRIEF DESCRIPTION OF THE SEVERAL VIEWS OF THE DRAWINGS

FIG. 10 is a side elevational view of a forklift scale, according to another embodiment, in which the load cell is integrally formed with a base portion of a lifting fork.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known structures, systems and techniques associated with scales and load cells may not be shown or described in detail to avoid unnecessarily obscuring descriptions of the embodiments. For example, it will be appreciated that the scales and load cells described herein may employ a variety of well-known measuring techniques to generate a load signal or signals that are indicative of a load carried by the forklift, and are not necessarily limited to the techniques described herein.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide forklift scales and load cells that are well adapted to measure loads in an accurate manner and in a compact and robust form factor. The forklift scales and load cells are independently mountable between the forks of a forklift and the fork carriage and can be installed with relatively minimal displacement of the forks from the fork carriage. Advantageously, this may allow the load rating of the host forklift to be maintained or substantially maintained despite the addition of the scales or load cells. Other advantages and benefits include the reduction or elimination of obstructions that are otherwise associated with conventional forklift scale systems. Still further, the forklift scales and load cells may be particularly easy to install and remove and can be scaled to provide a solution for a wide range of forklifts, including forklift trucks with load ratings from 5,000 lbs. up to and beyond 30 tons.

Figure 1:
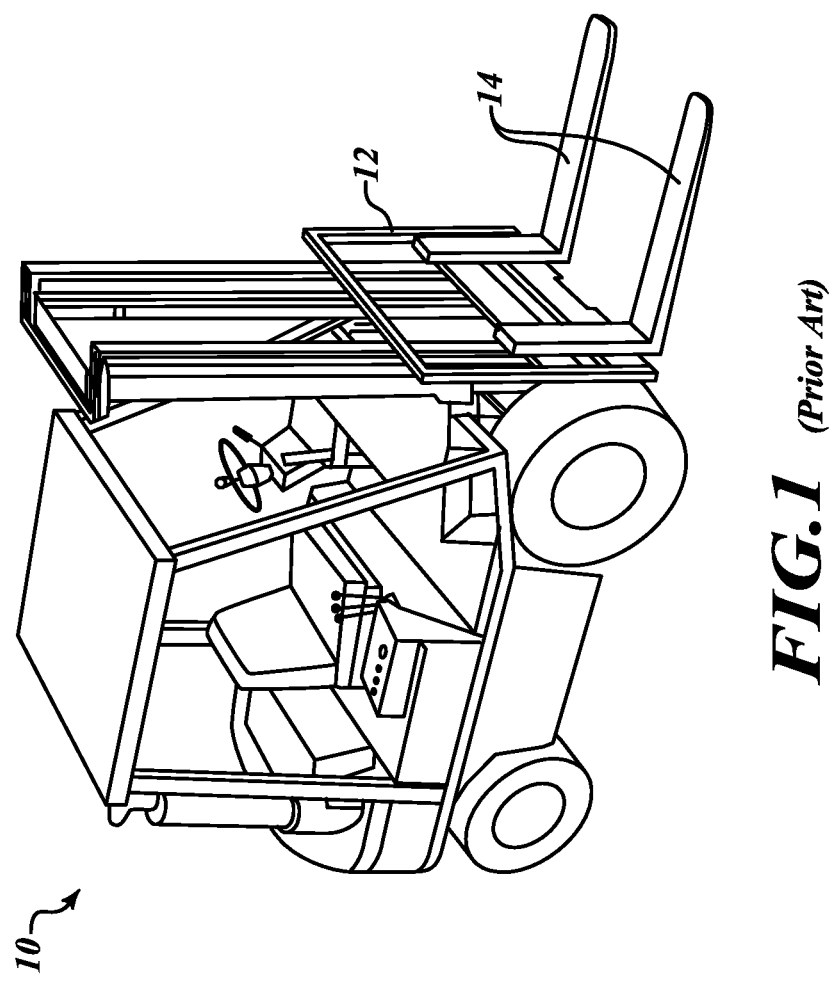
FIG. 1 is a perspective view of a conventional forklift to which the forklift scales and load cells described herein may be attached.
Figure 2:
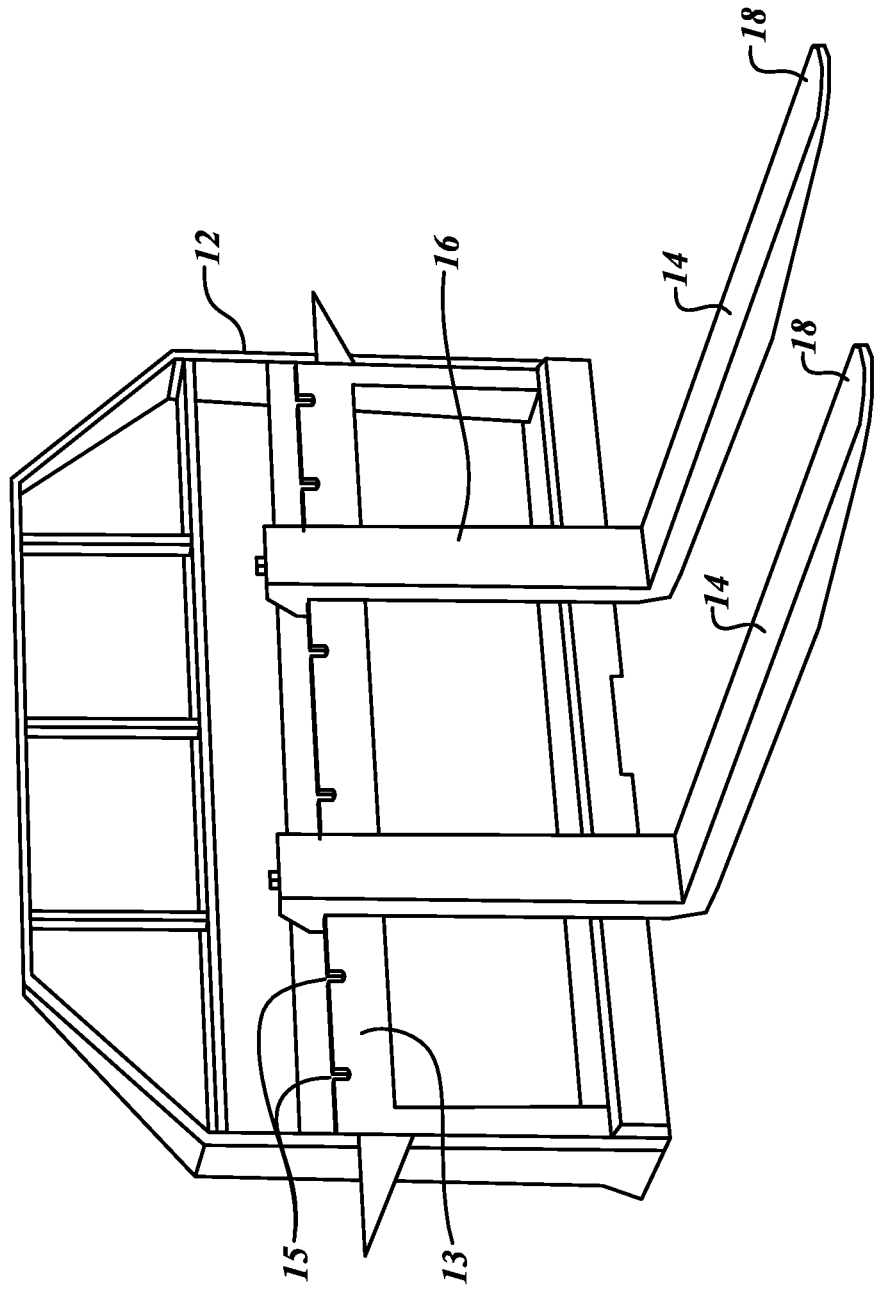
FIG. 2 is a perspective view of a fork carriage of a conventional forklift to which the forklift scales and load cells described herein may be attached.
Figure 3:
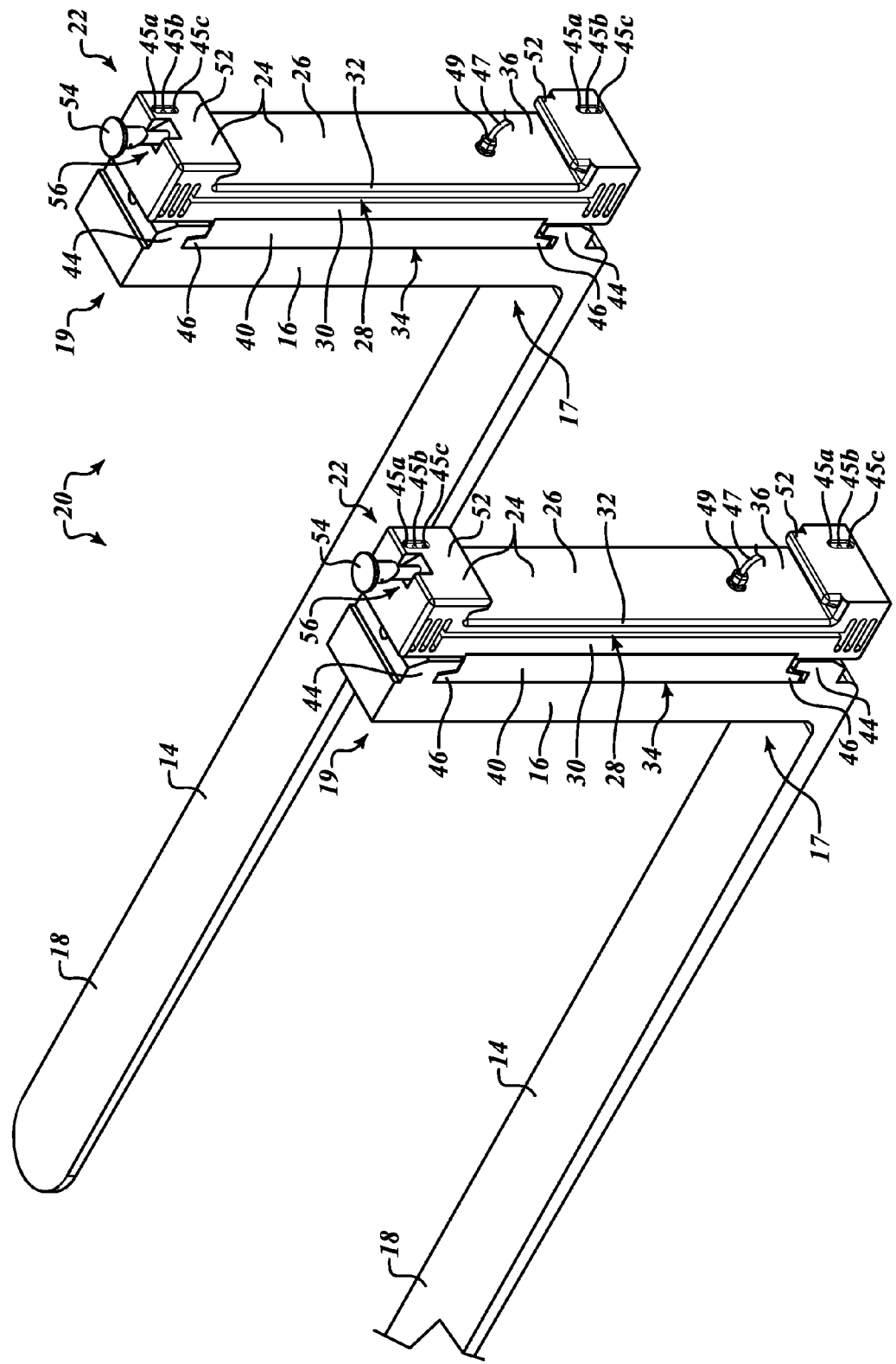
FIG. 3 is an isometric view of a forklift scale, according to one embodiment, shown coupled to conventional forks of a forklift.
Figure 4:
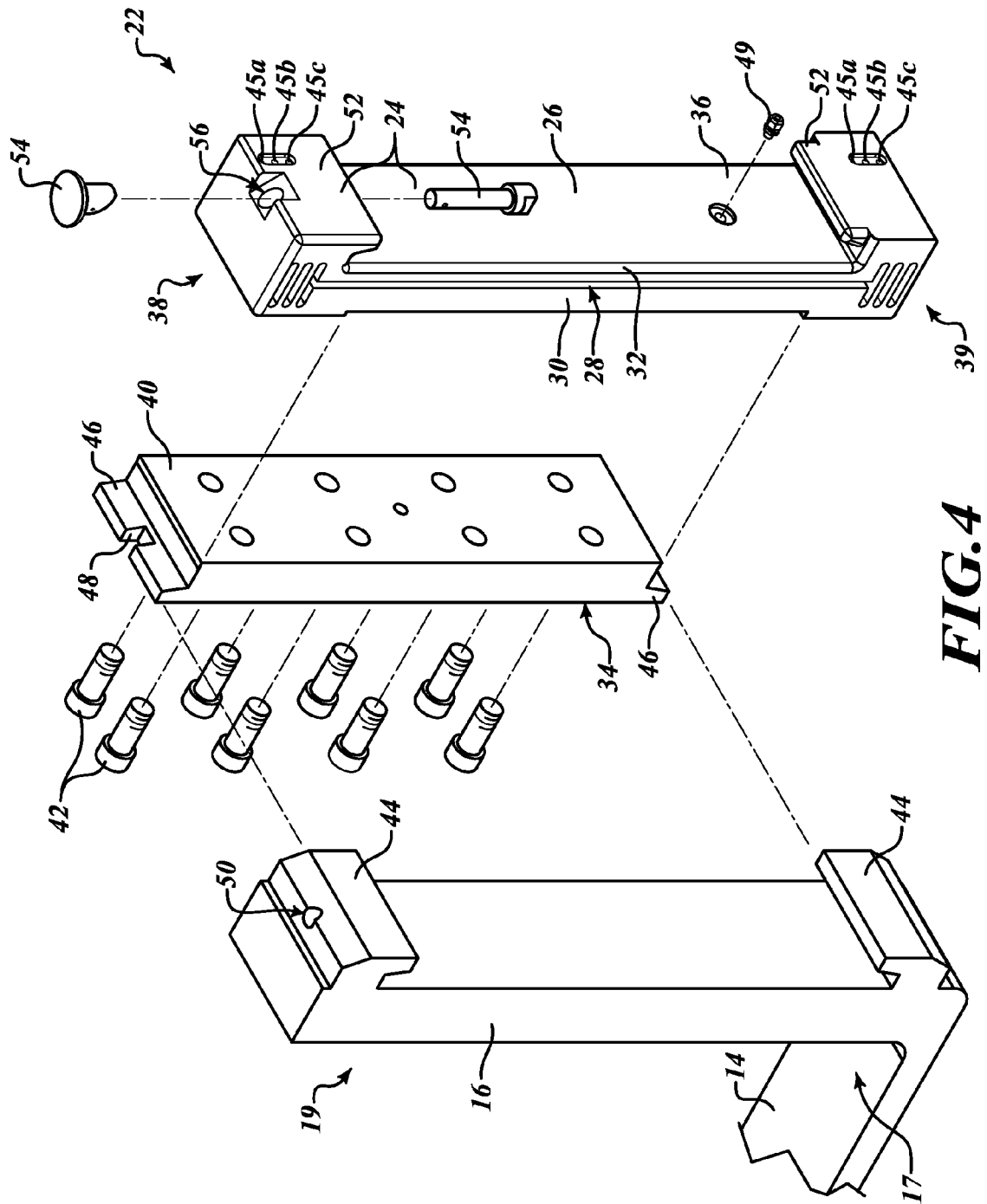
FIG. 4 is an isometric exploded view of the portion of the forklift scale of FIG. 3 along with a conventional fork.

FIGS. 3 through 7 show one example embodiment of a forklift scale 20 that is attachable to a forklift 10, such as the conventional forklift shown in FIG. 1, to measure a load carried by the forks 14 thereof. More particularly, with reference to FIG. 2, the forklift scale 20 is readily attachable between the forks 14 and a forklift carriage 12 that is controlled by an operator of the forklift 10 to raise and lower the forks 14 and optionally tilt the forks 14.

With reference to FIGS. 3 through 7, the forklift scale 20 includes a pair of load cells 22 that are configured to mount to a fork carriage 12 (FIGS. 1 and 2) independent of each other and to removably receive a respective fork 14 of a host forklift 10. Each load cell 22 includes a structural arrangement 24 that couples the respective fork 14 to the fork carriage 12 during operation such that an entirety of the load carried by the forks 14 is transmitted to the fork carriage 12 via the pair of load cells 22. The structural arrangement 24 may comprise a single, integral structure or a combination of distinct structural components that are coupled by fasteners, welding or other attachment mechanisms or techniques.

Figure 6:
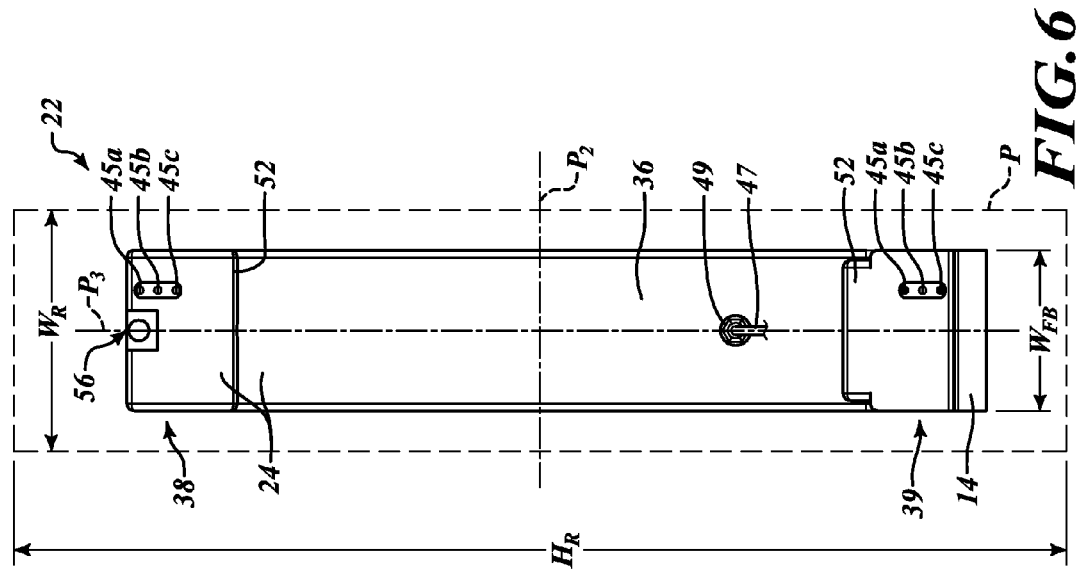
FIG. 6 is a rear elevational view of a portion of the forklift scale of FIG. 3 along with a conventional fork.
Figure 5:
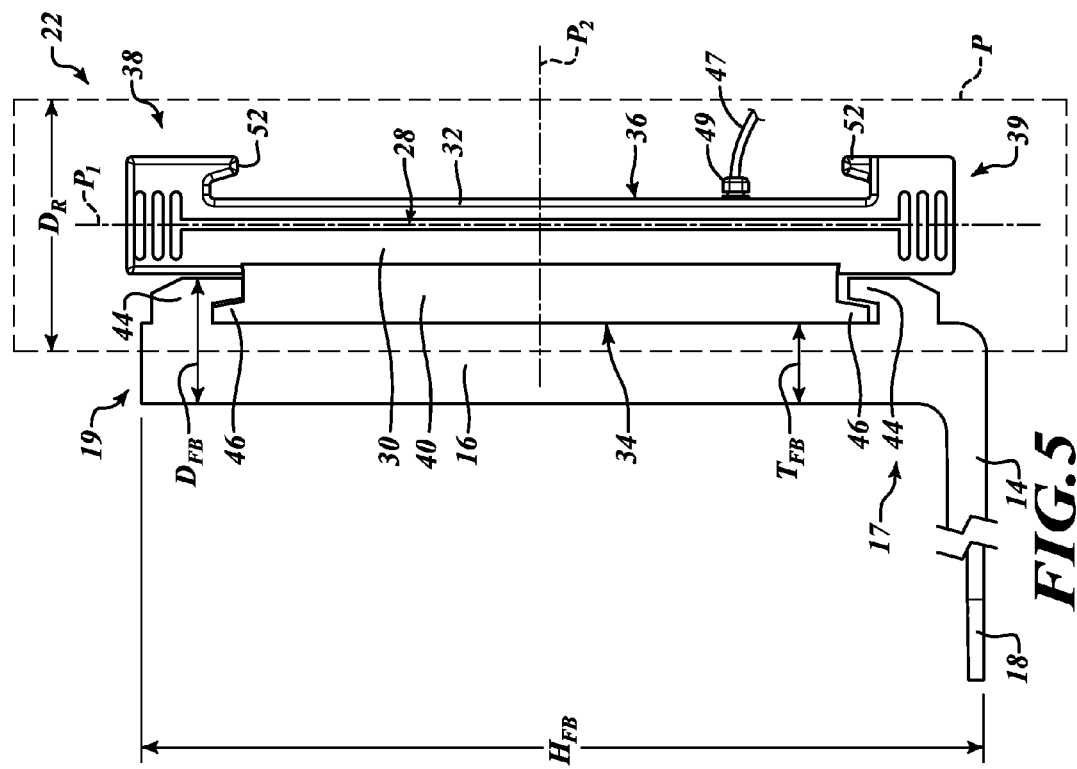
FIG. 5 is a side elevational view of the forklift scale of FIG. 3 along with a conventional fork.

The structural arrangement 24 of each load cell 22 may be particularly compact and robust. For example, a base 16 of the respective fork 14 to be received by each load cell 22 may define a fork base width $W_{FB}$, a fork base depth $D_{FB}$ and a fork base height $H_{FB}$, as shown in FIGS. 5 and 6, and the structural arrangement 24 of each load cell 22 may be configured such that the entirety of the structural arrangement 24 falls within a reference rectangular prism P defined by a reference width $W_R$ of one and one-half times the fork base width $W_{FB}$, a reference depth $D_R$ of two times the fork base depth $D_{FB}$ and a reference height $H_R$ of one and one-quarter times the fork base height $H_{FB}$. In some particularly advantageous embodiments, an overall width of the structural arrangement 24 may be less than or equal to the fork base width $W_{FB}$ and/or an overall height of the structural arrangement 24 may be equal or less than the fork base height $H_{FB}$.

Moreover, each load cell 22 may be configured such that each respective fork 14 is minimally displaced from its intended installation position on the fork carriage 12 during use. For example, when the forklift scale 20 is installed for use, each load cell 22 may space the respective fork 14 to which the load cell 22 is attached from a mounting face 13 (FIG. 2) of the carriage 12 by a distance less than or equal to twice a thickness $T_{FB}$ (FIG. 5) of the base 16 of the fork 14. In this manner, the rated load of the host forklift may be maintained or substantially maintained despite the presence of the forklift scale 20.

As shown in FIG. 3 through 6, the structural arrangement 24 of each load cell 22 may comprise an elongated structural member 26 that is configured to deform elastically in response to a load carried by the forks 14, the amount of deformation being indicative of a portion of the load carried by each respective fork 14. The elongated structural member 26 may be column-like and extend generally from a lower end 17 of the base 16 of the fork 14 to an upper end 19 of the base 16 of the fork 14. The elongated structural member 26 may include an elongated aperture 28 extending a majority of a height thereof that generally separates the elongated structural member 26 into fore and aft portions 30, 32. The aperture 28 may be I-shaped, dog-bone shaped or some other shape and may extend completely through a width of the elongated structural member 26. The elongated aperture 28 may be oriented generally parallel to opposing sides 34, 36 of the load cell 22.

The structural arrangement 24 of the load cell 22 may further include a bearing member 40 coupled to the elongated structural member 26. The bearing member 40 may be a separate component that is attached to the elongated structural member 26 by fasteners 42 (FIG. 4), welding or other attachment mechanisms or techniques. In other instances, the bearing member 40 and elongated structural member 26 may be integrally formed as a unitary member.

The bearing member 40 preferably includes engagement features 46 to couple with corresponding engagement features 44 of the fork 14 to which the load cell 22 is to be attached. For example, the bearing member 40 may include engagement features 46 in the form of outwardly directed hooks or a T-shaped extension that has a profile the same or similar to that of the fork carriage 12 to which the forks 14 are customarily attached. The forks 14 may include industry standard engagement features 44 in the form of hooks that generally nest with the hooks or T-shaped extension of the bearing member 40. The bearing member 40 may further include a notch 48 (FIGS. 4 and 7) to align with a locking aperture 50 in the fork 14 when the fork 14 is attached to the load cell 22. In this manner, the fork 14 may be attached to the load cell 22 and subsequently locked in place, such as, for example, by insertion of a lock pin (not shown) through the locking aperture 50 to engage the notch 48 in the bearing member 40.

In a related manner, the elongated structural member 26 of the load cell 22 may include engagement features 52 integral therewith or attached thereto to couple with corresponding features of the fork carriage 12. Accordingly, the load cell 22 may be easily secured to the fork carriage 12 in the same or similar manner in which the forks 14 are customarily attached to the fork carriage 12. The load cell 22 may further include a lock 54 to lock each load cell 22 to the fork carriage 12 during use. The lock 54 may be in the form of a lock pin that can be inserted through a locking aperture 56 of the load cell 22 to engage a notch 15 (FIG. 2) or other feature formed in the fork carriage 12.

As discussed earlier, the elongated structural member 26 may include an elongated aperture 28 extending a majority of a height thereof that generally separates the elongated structural member 26 into fore and aft portions 30, 32. The aperture 28 may be I-shaped, dog bone-shaped or other shapes and may extend completely through a width of the elongated structural member 26. The elongated aperture 28 may be oriented generally parallel to opposing sides 34, 36 of the load cell 22.

Figure 7:
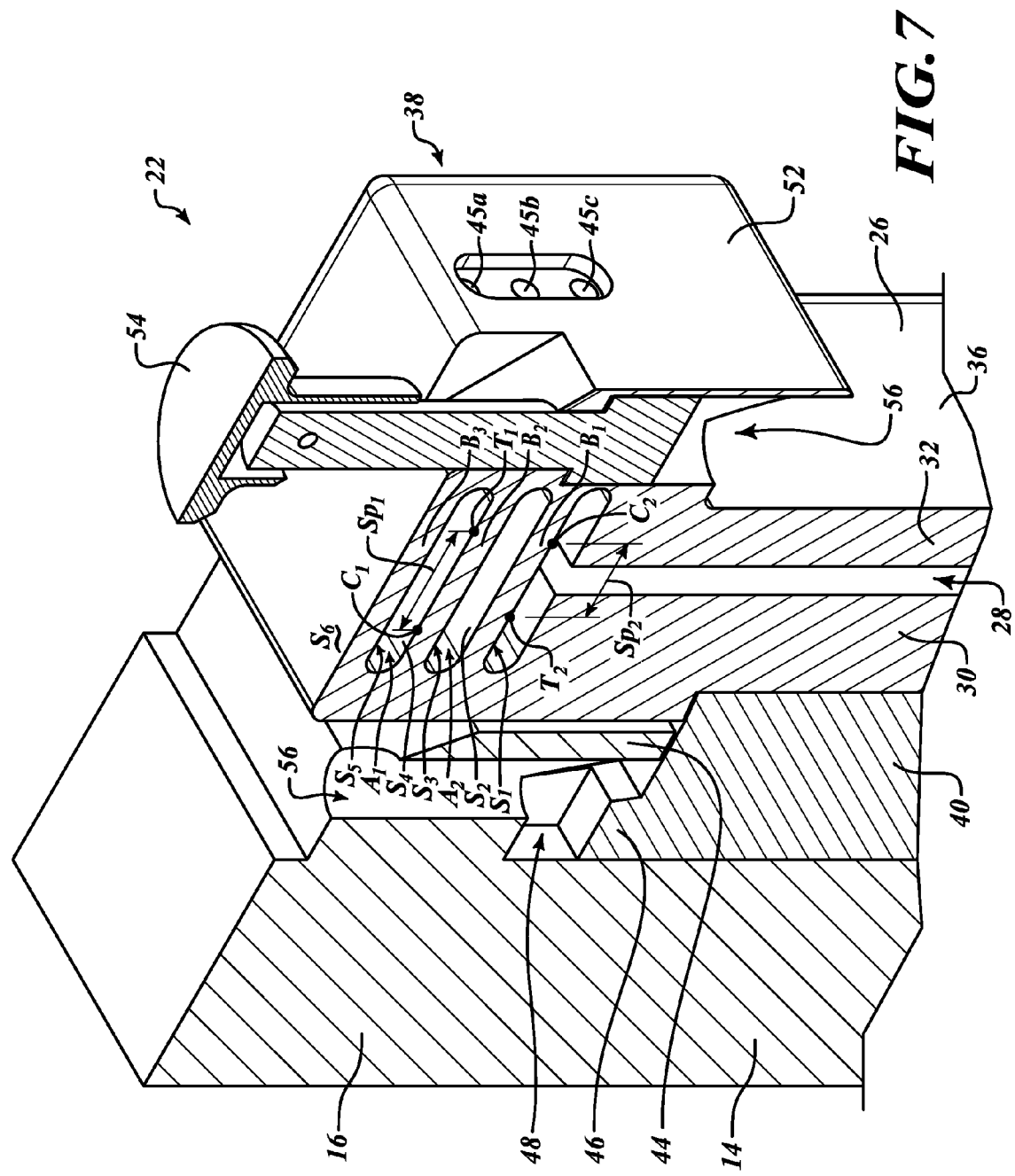
FIG. 7 is an enlarged isometric detail view of an upper portion of the forklift scale of FIG. 3.

In addition, with reference to FIG. 7, the aperture 28 may extend completely through a width of the elongated structural member 26 to at least partially define at least one thin-walled structural portion $B_1$ adjacent to the aperture 28 at each of opposing ends thereof 38, 39. The thin-walled structural portion $B_1$ may be generally planar and may include opposing surfaces $S_1$, $S_2$ that are generally parallel to a horizontal reference plane $P_2$ of the load cell 22. The elongated structural member 26 may include additional apertures $A_1$, $A_2$ at each of opposing ends thereof that extend completely through a width of the elongated structural member 26 in series to define one or more thin-walled structural portions $B_2$, $B_3$ adjacent to such apertures $A_1$, $A_2$. The additional thin-walled structural portions $B_2$, $B_3$ may also be generally planar and may include opposing surfaces $S_3$, $S_4$, $S_5$, $S_6$ that are generally parallel to the horizontal reference plane $P_2$ of the load cell 22. In this manner, each of the opposing ends 38, 39 of the elongated structural member 26 may be provided with a series of planar surfaces $S_1$-$S_6$ that are suitable to receive strain gauges in accordance with various embodiments described herein. The apertures 28, $A_1$, $A_2$ may define internal cavities within the elongated structural member 26 that provide space for routing electrical leads to the strain gauges that may be housed or received in the internal cavities. Respective access passages 45a-45c may be provided in communication with the cavities to facilitate routing of the electrical leads into or out of the structural member 26 at a generally common location. The electrical leads may originate from a respective cable 47 that is connected to each load cell 22 with a cable connector 49. After the leads or connected to the strain gauges, each of the apertures 28, $A_1$, $A_2$ and the access passages 45a-45c may be filled with potting material to provide a substantially sealed environment. In this manner, each load cell 22 may be particularly well suited for use in harsh environments.

Each load cell 22 may further include a plurality of strain gauges (not shown), and wherein, for each load cell 22, at least some of the strain gauges may be located on one or more of the thin-walled structural portions $B_1$-$B_3$ defined by the apertures 28, $A_1$, $A_2$. For example, a first bridge arrangement of four strain gauges may be attached to the horizontal mounting surfaces $S_4$ located at each of the opposing ends 38, 39 of the load cell 22, and a second bridge arrangement of strain gauges may be attached to the horizontal mounting surfaces $S_1$ located at each of the opposing ends 38, 39 of the load cell 22, as indicated by the locations labeled $T_1$, $C_1$, $T_2$, $C_2$ in FIG. 7 with respect to the upper end 38 of the load cell 22. The strain gauges located at positions $T_1$ and $T_2$ may be placed in tension by the applied load on the forks 14 and the strain gauges located at positions $C_1$ and $C_2$ may be placed in compression. The strain gauges at locations $T_1$, $C_1$ on surface $S_4$ at the upper end 38 may be electrically connected to corresponding strain gauges at the lower end 39 in a Wheatstone bridge configuration to collectively generate a signal indicative of a portion of the load carried by the load cell 22 during operation. Similarly, the strain gauges at locations $T_2$, $C_2$ on surface $S_1$ at the upper end 38 may be electrically connected to corresponding strain gauges at the lower end 39 in a Wheatstone bridge configuration to collectively generate a signal indicative of a portion of the load carried by the load cell 22 during operation. The signal generated by the first bridge arrangement may be combined or analyzed together with a signal generated by the second bridge arrangement. Still further, the signals generated by the bridge arrangements of both load cells 22 may be combined or analyzed together to generate a combined load signal indicative of the load placed on the forks 14 during operation.

Advantageously, the strain gauges of each bridge arrangement may be configured such that the load cell 22 is substantially insensitive to the positioning of the load along a length of the forks 14. More particularly, the first bridge arrangement may be arranged such that it experiences a signal increase with increasing distance of the load from the base 16 of the forks 14 toward the tips 18 and the second bridge arrangement may be arranged such that it experiences a signal decrease with increasing distance of the load from the base 16 of the forks 14 toward the tips 18. The strain gauges of each bridge arrangement may be positioned such that a magnitude of the signal increase exhibited by the first bridge arrangement is about equal to a magnitude of the corresponding signal decrease exhibited by the second bridge arrangement such that a summation of the magnitudes of the signals of the bridge arrangements remains generally constant with changing position of the load along the forks 14. In some instances, a scale factor or other calibration adjustment may be applied to one or more of the signals such that the summation of the magnitudes of the signals of the bridge arrangements remains generally constant with changing position of the load along the forks 14. The locations $T_1$, $C_1$, $T_2$, $C_2$ of FIG. 6 illustrate one example of strain gauge locations at the upper end 38 that in combination with corresponding strain gauge locations at the lower end 39 that generally exhibit the features and functionality described above. It will be appreciated that the arrangement of locations $T_1$, $C_1$, $T_2$, $C_2$ described with respect to the upper end 38 of the load cell may also apply directly to the lower end 39 of the load cell 22 such the arrangement of strain gauge locations of the first and the second bridge arrangements are symmetric or generally symmetric about a plane of symmetry.

In some instances, the summation of the magnitudes of the signals of the bridge arrangements may deviate slightly with changing position of the load along the forks 14. For example, in some configurations a generally constant summation may be obtained with changing position of the load near the base 16 of the forks 14 and near the tips 18 of the forks with an intermediate range deviating slightly such that the response throughout all load positions bows slightly from a straight line response. In such instances, it is advantageous to apply a correction factor or other adjustments to the readings based on load position to compensate for the non-linear response and obtain greater accuracy of load measurements. According to some embodiments, this may be achieved by taking a ratio of the bridge readings, which may increase substantially linearly as the distance of the center of gravity of the load increases from the load cell 22, to determine the position of the load relative to the forks 14 and hence load cell 22 with reasonable accuracy (e.g., within inches of the actual position of the center of gravity of the load). Knowing the center of gravity or approximate center of gravity of the load, it is then possible to adjust or correct the aforementioned non-linear response based on said load position. For example, a lookup table which correlates the load position to an appropriate corrective factor based on empirical data may be used to adjust or correct the aforementioned non-linear response. Moreover, this correction can be made automatically using an onboard computing system, which is not shown or described in further detail to avoid unnecessarily obscuring descriptions of the embodiments.

While knowing the center of gravity or approximate center of gravity is advantageous for enabling the functionality described above, it may also be beneficial to know the center of gravity or approximate center of gravity so that the capacity of the host forklift or other lift system can be de-rated appropriately as the position of the center of gravity of the load increases and results in a greater moment applied to the forks 14 or other lifting structure. In some instances, for example, the scale 20 may automatically disable lifting of a load when the center of gravity of the load is located such that it causes the load desired to be lifted to exceed the rated capacity of the forklift at that particular center of gravity position. For this purpose, the scale 20 may be communicatively coupled to a control system of the forklift or other host lifting system to disable lifting functionality, such as, for example, by disabling or limiting the movement of the lift system. An audible alarm, warning light or other indication may be provided when the load at a given center of gravity position exceeds the rated load at that position. Additionally, the control system of the forklift may evaluate the position of the center of gravity of the load and the magnitude of the load in conjunction with one or more signals or data indicative of the height and/or angle of the forks 14 to determine whether it is safe to operate the forklift under such conditions. Lifting, tilting or other movement of the forks 14 may be disabled or limited when exceeding a rated load or deviating from a predetermined safe operation condition.

As shown in FIG. 7, the first bridge arrangement of strain gauges may include a set or pair of strain gauges located on horizontal mounting surface $S_4$ at locations $T_1$, $C_1$ at each of opposing ends 38, 39 of the load cell 22 and the second bridge arrangement of strain gauges may include a set or pair of strain gauges located on horizontal mounting surface $S_1$ at locations $C_2$, $T_2$ at each of opposing ends 38, 39 of the load cell 22. For each end 38, 39, the set of strain gauges of the first bridge arrangement at locations $T_1$, $C_1$ may be positioned generally opposite the set of strain gauges of the second bridge arrangement at locations $T_2$, $C_2$. The set of strain gauges of the first bridge arrangement at locations $T_1$, $C_1$ may be located further away from the central horizontal reference plane $P_2$ (FIGS. 5 and 6) of the load cell 22 than the set of strain gauges of the second bridge arrangement at locations $T_2$, $C_2$, and a spread $Sp_1$ of the set of strain gauges of the first bridge arrangement at locations $T_1$, $C_1$ may be greater than a spread $Sp_2$ of the set of strain gauges of the second bridge arrangement at locations $T_2$, $C_2$. The difference in spread or lateral offset between the sets of strain gauges may be determined experimentally to arrive at a suitable value that results in bridge arrangements that generally counteract sensitivities in each other to form a load cell that is particularly insensitive to the position of the load along the length of the forks 14.

In some embodiments, for example, the strain gauges of the first and the second bridge arrangements may be arranged such that a load value indicative of the load shared by the pair of forks is maintained below a threshold accuracy of about 0.5 percent irrespective of a position of the load along a length of the forks. In other embodiments, the threshold accuracy may be about 0.1 percent or less. To assist in achieving the highest levels of accuracy, a supplemental bridge arrangement may be established between the upper end 38 and the lower end 39 of the load cell 22 to generate a supplemental signal that is indicative of the moment placed on the load cell by the load on the forks 14. This supplemental bridge arrangement may be configured to be particularly sensitive to the position of the load on the forks such that corrective adjustment may be made to the load signal generated by the load cells 22. In some embodiments, the supplemental bridge arrangement of strain gauges may include a first and a second set of strain gauges located on opposing sides of the central horizontal reference plane $P_2$ (FIGS. 5 and 6) of load cell 22 and located on opposing sides of a vertical reference plane $P_1$ (FIG. 5) of the load cell 22 that is generally parallel to the opposing sides 34, 36 of the load cell 22.

In other instances, the first and the second bridge arrangements may be used to generate a signal that is indicative of the moment placed on the load cell by the load on the forks 14 to determine the position of the center of gravity of the load with reasonable accuracy. For example, as discussed earlier, this may be achieved by taking a ratio of the bridge readings, which increase substantially linearly as the distance of the center of gravity of the load increases from the load cell 22, to determine the position of the load relative to the forks 14 and hence load cell 22. The load position data can then be used to apply corrective adjustment to the load signal(s) generated by the load cells 22 via an onboard computing system, which again is not shown or described in further detail to avoid unnecessarily obscuring descriptions of the embodiments.

Although the example embodiment of FIGS. 3 through 7 includes three separate thin-wall or beam portions at each of opposing ends 38, 39 of the structural member 26 of the load cell 22 which define a series of planar mounting surfaces $S_1$-$S_6$ for strain gauges, it is appreciated that in some embodiments, more or fewer thin-wall or beam portions may be provided. In addition, although embodiments of the load cells 22 are described herein as including two strain gauge bridge arrangements that interact to reduce load placement sensitivities, it is appreciated that, in some embodiments, a single bridge arrangement may be provided for each load cell 22 with one pair of strain gauges on one of the various horizontal mounting surfaces $S_1$-$S_6$ at the upper end 38 of the load cell 22 and with another pair of strain gauges on one of the various horizontal mounting surfaces $S_1$-$S_6$ at the lower end 38 of the load cell 22.

Figure 9:
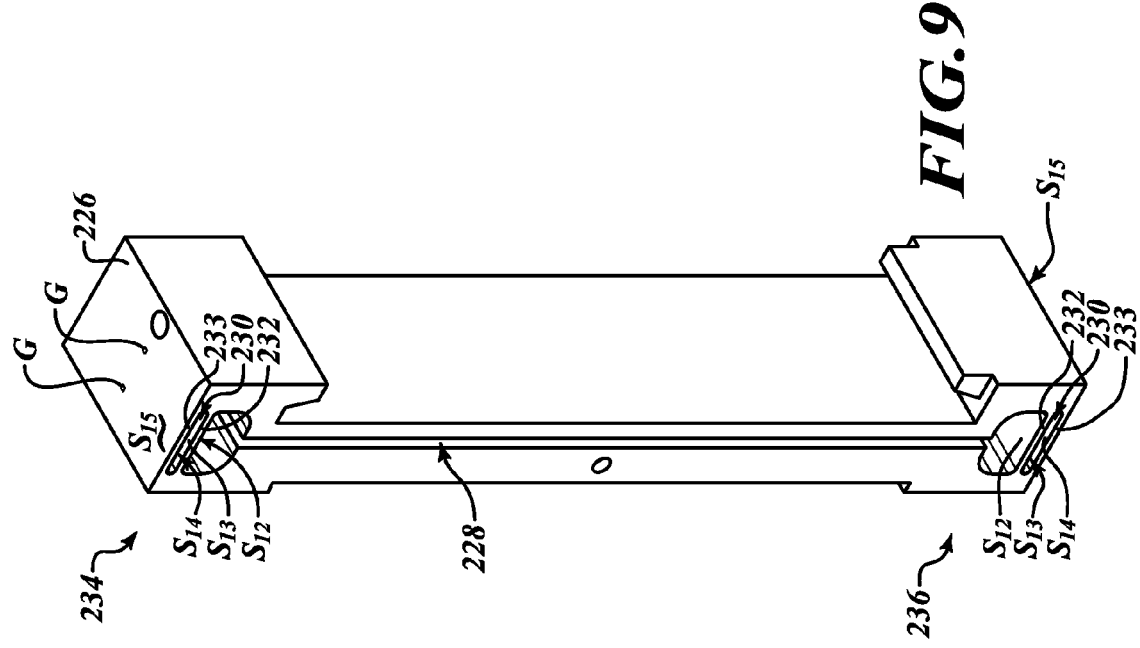
FIG. 9 is an isometric view of a structural member of a load cell, according to another embodiment.
Figure 8:
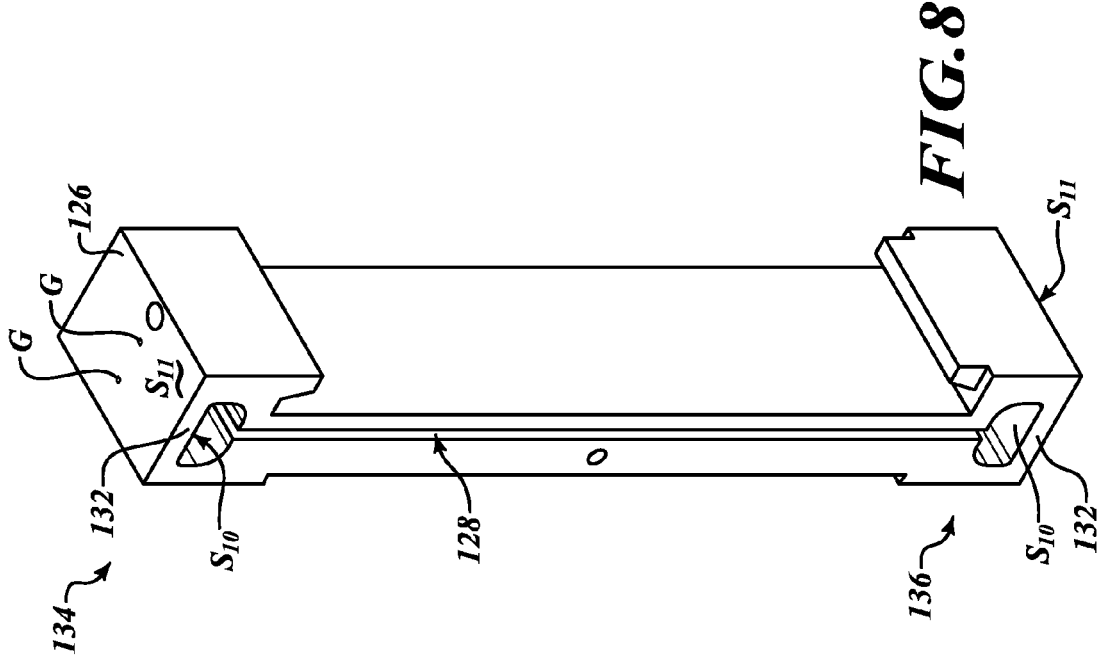
FIG. 8 is an isometric view of a structural member of a load cell, according to one embodiment.

FIGS. 8 and 9 show other embodiments of elongated structural members 126, 226 that may be provided in connection with the load cells, scale systems and methods described herein. More particularly, FIG. 8 shows one embodiment in which the elongated structural member 126 includes a single I-shaped or dog bone-shaped aperture 128 that at least partially defines a single thin-walled portion 132 at each of opposing ends 134, 136 thereof. The thin-walled portions 132 are generally planar and define opposing surfaces $S_{10}$, $S_{11}$ for receiving strain gauges G. FIG. 9 shows another embodiment in which the elongated structural member 226 includes an I-shaped or dog bone-shaped aperture 228 and a supplemental aperture 230 at each of opposing ends 234, 236 of the structural member 226. The apertures 228, 230 at least partially define a series of thin-walled portions 232, 233 at each of opposing ends 234, 236 thereof. The thin-walled portions 232, 233 are generally planar and define opposing surfaces $S_{12}$, $S_{13}$, $S_{14}$, $S_{15}$ for receiving strain gauges G. The thin-walled portions 232, 233 may have the same or similar thicknesses. In use, strain gauges may be arranged on one of more of the surfaces $S_{12}$, $S_{13}$, $S_{14}$, $S_{15}$ of the thin-walled portions 232, 233 for obtaining signals indicative of a portion of the load carried by the structural member 226.

FIG. 10 shows yet another embodiment of a scale system 300. The scale system 300 includes a load cell arrangement having features similar to those of other embodiments described herein but which is integrally formed with a base portion of a lifting fork to form an integral fork structure having load measuring capabilities. This may particularly advantageous, for example, in minimizing or even eliminating any lateral offset of the forks that may otherwise be associated with installing a separate, intermediate load cell structure between conventional forks and a conventional fork frame. In fact, in some instances, the scale system 300 may have a general profile that is the same or substantially the same as a profile of a conventional fork, as illustrated in FIG. 10, for example. The body of the scale system may be cast, machined or otherwise formed as a unitary structure and then fitted with strain gauges and wired appropriately to a control system for obtaining load measurements in accordance with various aspects of the embodiments described herein.

In accordance with the embodiments of the load cells and scale systems described herein, related methods of measuring a load carried by a pair of forks of a forklift are also provided. For instance, in some embodiments, a method of measuring a load carried by a pair of forks of a forklift may be provided which includes: obtaining strain gauge signals from a pair of independently mountable load cells that are each positioned between a fork carriage and a respective one of the forks; and processing the signals to obtain a load value indicative of a load shared by the pair of forks.

Obtaining strain gauge signals from the pair of independently mountable load cells may include obtaining, for each load cell, strain gauge signals from a respective first bridge arrangement of strain gauges located at each of opposing ends of the load cell and strain gauge signals from a respective second bridge arrangement of strain gauges located at each of opposing ends of the load cell. The first bridge arrangement of strain gauges may include a first set of strain gauges located on one of parallel offset horizontal mounting surfaces at an upper end of the load cell and a second set of strain gauges located on one of parallel offset horizontal mounting surfaces at a lower end of the load cell. Likewise, the second bridge arrangement of strain gauges may include a first set of strain gauges located on another one of the parallel offset horizontal mounting surfaces at an upper end of the load cell and a second set of strain gauges located on another one of the parallel offset horizontal mounting surfaces at a lower end of the load cell. The first set of strain gauges of the first bridge arrangement may be positioned generally opposite the first set of strain gauges of the second bridge arrangement, and the second set of strain gauges of the first bridge arrangement may be positioned generally opposite the second set of strain gauges of the second bridge arrangement. The first set of strain gauges of the first bridge arrangement may be located further away from a central horizontal reference plane of the load cell than the first set of strain gauges of the second bridge arrangement, and a spread of the first set of strain gauges of the first bridge arrangement may be greater than a spread of the first set of strain gauges of the second bridge arrangement.

The strain gauges may be arranged such that the load value indicative of the load shared by the pair of forks is maintained below a threshold accuracy of about 0.5 percent irrespective of a position of the load along a length of the forks. For each load cell, the first bridge arrangement of strain gauges may exhibit a signal increase when the load is positioned on the forks with increasing distance from the load cell and the second bridge arrangement of strain gauges may exhibit a signal decrease when the load is positioned on the forks with increasing distance from the load cell. A magnitude of the signal increase exhibited by the first bridge arrangement of strain gauges when the load is positioned on the forks with increasing distance from the load cell may be about equal to a magnitude of the corresponding signal decrease exhibited by the second bridge arrangement of strain gauges such that a summation of the magnitudes of the signals of the first and the second bridge arrangements remains generally constant with changing position of the load along the forks. In other instances, a summation of the magnitudes of the signals of the first and the second bridge arrangements may deviate slightly with changing position of the load along the forks and may exhibit a slightly bowed, yet generally linear response.

The method may further include determining a position of the load carried by the pair of forks using the strain gauge signals from the pair of independently mountable load cells; and adjusting the load value indicative of the load shared by the pair of forks based on said determined position and/or disabling or limiting movement of the forklift based on said determined position. Determining the position of the load may include using the strain gauge signals from the first bridge arrangement and the second bridge arrangement. In other instances, the method may include obtaining, for each load cell, a supplemental signal from a third bridge arrangement of strain gauges. In such embodiments, the third bridge arrangement may comprise a first and a second set of strain gauges located on opposing sides of a central horizontal reference plane of the load cell and located on opposing sides of a vertical reference plane of the load cell that is generally parallel to a mounting face thereof. It is appreciated, however, that a wide variety of strain gauge positions and orientations may be used in connection with the methods and scale systems described herein.

Although the embodiments shown and described herein have been discussed in the context of use with conventional forklifts, it is appreciated that embodiments of the scales, load cells and related methods disclosed herein may be suitable for a wide range of equipment that is configured to manipulate a cantilevered load on one or more fork or fork-like lift members. For example, embodiments described herein may be applied to waste management vehicles equipped with lift systems for waste bins. In addition, as mentioned above, the scale systems and load cells may be scaled to provide a solution for a wide range of forklifts, including forklift trucks with load ratings from 5,000 lbs. up to and beyond 30 tons. In addition, it will be appreciated that the systems described herein may include a pitch and roll inclinometer to sense a pitch and roll of the fork carriage 12 (and hence the load cells 22) and adjust load signals and calculations accordingly.

Moreover, aspects of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Application Ser. No. 61/785,316 filed Mar. 14, 2013, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A forklift scale to measure a load carried by a pair of forks of a forklift that includes a fork carriage to movably position the forks, the forklift scale comprising:
a pair of load cells, each load cell configured to mount to the fork carriage independent of the other and to removably receive a respective fork of the forklift, and wherein each load cell includes a structural arrangement that couples the respective fork to the fork carriage during operation such that an entirety of the load carried by the forks is transmitted to the fork carriage via the pair of load cells, the structural arrangement of each load cell including an elongated, vertically oriented structural member having a vertically oriented aperture extending entirely through a width of the elongated, vertically oriented structural member, the elongated, vertically oriented structural member being configured to deform elastically in response to a load carried by the forks to generate load signals from strain gauges positioned at upper and lower ends of the elongated, vertically oriented structural member.

2. The forklift scale of claim 1 wherein a base of the respective fork to be received by each load cell defines a fork base width, a fork base depth and a fork base height, and wherein the structural arrangement of each load cell is configured such that the entirety of the structural arrangement falls within a reference rectangular prism defined by a reference width of one and one-half times the fork base width, a reference depth of two times the fork base depth and a reference height of one and one-quarter times the fork base height.

3. The forklift scale of claim 1 wherein, when the forklift scale is installed for use, each load cell spaces the respective fork to which the load cell is attached from a mounting face of the carriage by a distance less than or equal to twice a thickness of a base of the fork.

4. The forklift scale of claim 1 wherein the vertically oriented aperture extends a majority of a height of the elongated, vertically oriented structural member.

5. The forklift scale of claim 4 wherein the vertically oriented aperture is I-shaped.

6. The forklift scale of claim 4 wherein the vertically oriented aperture is oriented generally parallel to opposing sides of the load cell.

7. The forklift scale of claim 1 wherein the structural arrangement further comprises a bearing member coupled to the elongated, vertically oriented structural member, the bearing member including engagement features to couple with corresponding features of the fork.

8. The forklift scale of claim 7 wherein the bearing member includes a notch to align with a locking aperture in the fork when the fork is attached to the load cell.

9. The forklift scale of claim 1 wherein the elongated, vertically oriented structural member includes engagement features integral therewith to couple with corresponding features of the fork.

10. The forklift scale of claim 1 wherein the elongated, vertically oriented structural member includes engagement features integral therewith to couple with corresponding features of the fork carriage.

11. The forklift scale of claim 1 wherein the vertically oriented aperture extending through the width of the elongated, vertically oriented structural member at least partially defines at least one thin-walled structural portion adjacent to the vertically oriented aperture.

12. The forklift scale of claim 11 wherein the thin-walled structural portion is generally planar and includes opposing surfaces that are generally parallel to a horizontal reference plane of the respective load cell.

13. The forklift scale of claim 12 wherein, for each load cell, at least some of the strain gauges are located on the at least one thin-walled structural portion thereof.

14. The forklift scale of claim 1 wherein the elongated, vertically oriented structural member includes a plurality of distinct apertures extending through a width thereof in series to define at least one thin-walled structural portion between the apertures.

15. The forklift scale of claim 1 wherein each load cell further includes a lock to lock each load cell and respective fork to the carriage during use.

16. A forklift scale to measure a load carried by a pair of forks of a forklift having a fork carriage to movably position the forks, the forklift scale comprising:
a first load cell having a deformable body configured to mount directly to the fork carriage and being configured to removably receive one of the pair of forks of the forklift; and
a second load cell having a deformable body configured to mount directly to the fork carriage and being configured to removably receive the other one of the pair of forks of the forklift,
wherein the first load cell and the second load cell are independently attachable to the fork carriage, and
wherein the deformable body of each of the first and second load cells is elongated and vertically oriented, includes a vertically oriented aperture extending entirely through a width thereof, and is configured to deform elastically in response to a load carried by the forks to generate load signals from strain gauges positioned at upper and lower ends thereof.

17. A load cell to measure a portion of a load carried by a pair of forks of a forklift that includes a fork carriage to movably position the forks, the load cell comprising:
an elongated, vertically oriented structural member including opposing side portions separated by a primary, vertically oriented aperture extending entirely through a width of the elongated, vertically oriented structural member and extending at least a majority of a height of the elongated structural member, the elongated, vertically oriented structural member further including at least one pair of parallel offset horizontal strain gauge mounting surfaces at each of opposing upper and lower ends of the elongated, vertically oriented structural member, and the elongated, vertically oriented structural member being configured to deform elastically in response to a load carried by the forks to generate load signals from strain gauges positioned at the horizontal strain gauge mounting surfaces at the upper and lower ends of the elongated, vertically oriented structural member;
carriage engagement features configured to removably attach to complementary features of the fork carriage; and
fork engagement features configured to removably attach to complementary features of one of the forks.

18. The load cell of claim 17 wherein at least one of the carriage engagement features and the fork engagement features are integrally formed with the elongated, vertically oriented structural member.

19. The load cell of claim 17 wherein a base of the fork to be attached to the load cell defines a fork base width, a fork base depth and a fork base height, and wherein an entirety of a load bearing structure of the load cell is configured such that the load bearing structure falls within a reference rectangular prism defined by a reference width of one and one-half times the fork base width, a reference depth of two times the fork base depth and a reference height of one and one-quarter times the fork base height.

20. The load cell of claim 17, further comprising:
a first bridge arrangement of strain gauges including one pair of strain gauges mounted on one of the parallel offset horizontal mounting surfaces located at one of the opposing upper and lower ends of the elongated, vertically oriented structural member of the load cell and one pair of strain gauges mounted on one of the parallel offset horizontal mounting surfaces located at the other one of the opposing upper and lower ends of the elongated, vertically oriented structural member of the load cell; and
a second bridge arrangement of strain gauges including one pair of strain gauges mounted on one of the parallel offset horizontal mounting surfaces located at one of the opposing upper and lower ends of the elongated, vertically oriented structural member of the load cell and one pair of strain gauges mounted on one of the parallel offset horizontal mounting surfaces located at the other one of the opposing upper and lower ends of the elongated, vertically oriented structural member of the load cell.

21. The load cell of claim 20 wherein the first bridge arrangement of strain gauges includes a first set of strain gauges located on one of the parallel offset horizontal mounting surfaces at the upper end of the elongated, vertically oriented structural member and a second set of strain gauges located on one of the parallel offset horizontal mounting surfaces at the lower end of the elongated, vertically oriented structural member, and wherein the second bridge arrangement of strain gauges includes a first set of strain gauges located on one of the parallel offset horizontal mounting surfaces at the upper end of the elongated, vertically oriented structural member and a second set of strain gauges located on one of the parallel offset horizontal mounting surfaces at the lower end of the elongated, vertically oriented structural member.

22. The load cell of claim 21 wherein the first set of strain gauges of the first bridge arrangement is positioned generally opposite the first set of strain gauges of the second bridge arrangement.

23. The load cell of claim 22 wherein the first set of strain gauges of the first bridge arrangement is located further away from a central horizontal reference plane of the load cell than the first set of strain gauges of the second bridge arrangement, and wherein a spread of the first set of strain gauges of the first bridge arrangement is greater than a spread of the first set of strain gauges of the second bridge arrangement.

24. The load cell of claim 20 wherein the strain gauges are arranged such that a load value indicative of the load shared by the pair of forks is maintained below a threshold accuracy of about 0.5 percent irrespective of a position of the load along a length of the forks, and wherein, for each load cell, the first bridge arrangement of strain gauges exhibits a signal increase when the load is positioned on the forks with increasing distance from the load cell and the second bridge arrangement of strain gauges exhibits a signal decrease when the load is positioned on the forks with increasing distance from the load cell.

25. The load cell of claim 24 wherein a magnitude of the signal increase exhibited by the first bridge arrangement when the load is positioned on the forks with increasing distance from the load cell is about equal to a magnitude of the corresponding signal decrease exhibited by the second bridge arrangement such that a summation of the magnitudes of the signals of the first and the second bridge arrangements remains generally constant with changing position of the load along the forks.

* * * * *